United States Patent [19]
Kline

[11] Patent Number: 4,527,655
[45] Date of Patent: Jul. 9, 1985

[54] DRIVE CHAIN ADJUSTER

[75] Inventor: Charles M. Kline, Reinholds, Pa.

[73] Assignee: Sperry Corporation, New Holland, Pa.

[21] Appl. No.: 645,591

[22] Filed: Aug. 30, 1984

[51] Int. Cl.³ .............................................. B66F 9/00
[52] U.S. Cl. .................................. 180/246; 180/6.48; 180/251; 474/133
[58] Field of Search ................. 180/6.48, 24.05, 24.06, 180/24.08, 246, 251; 474/101, 133, 134, 136

[56] References Cited

U.S. PATENT DOCUMENTS

| | | | |
|---|---|---|---|
| 310,127 | 12/1884 | Dawson | 474/133 |
| 1,491,008 | 4/1924 | Goldstein | 474/136 |
| 1,751,394 | 3/1930 | Christie | 180/24.05 |
| 2,795,254 | 6/1957 | Hill | 474/134 X |
| 3,810,517 | 5/1974 | Hurlburt | 180/246 |

FOREIGN PATENT DOCUMENTS 55-78729  6/1980  Japan .................................. 180/246

Primary Examiner—Robert G. Nilson
Attorney, Agent, or Firm—Larry W. Miller; Frank A. Seemar; Darrell F. Marquette

[57] ABSTRACT

A skid steer loader having transversely spaced wheel assemblies driven through a drive chain entrained around a tensioning idler is disclosed wherein the tensioning idler is mounted in a pair of arms movably positionable by an adjusting mechanism to control the tension in the drive chain. The adjusting mechanism is housed within a box welded to the chain case and includes a necked down portion extending through the box for external manipulation of a drive portion. An O-ring seal prevents the loss of fluid from the box during operation of the loader. A spring clip engagable with the drive portion of the adjusting mechanism prevents the movement thereof during operation of the loader.

8 Claims, 5 Drawing Figures

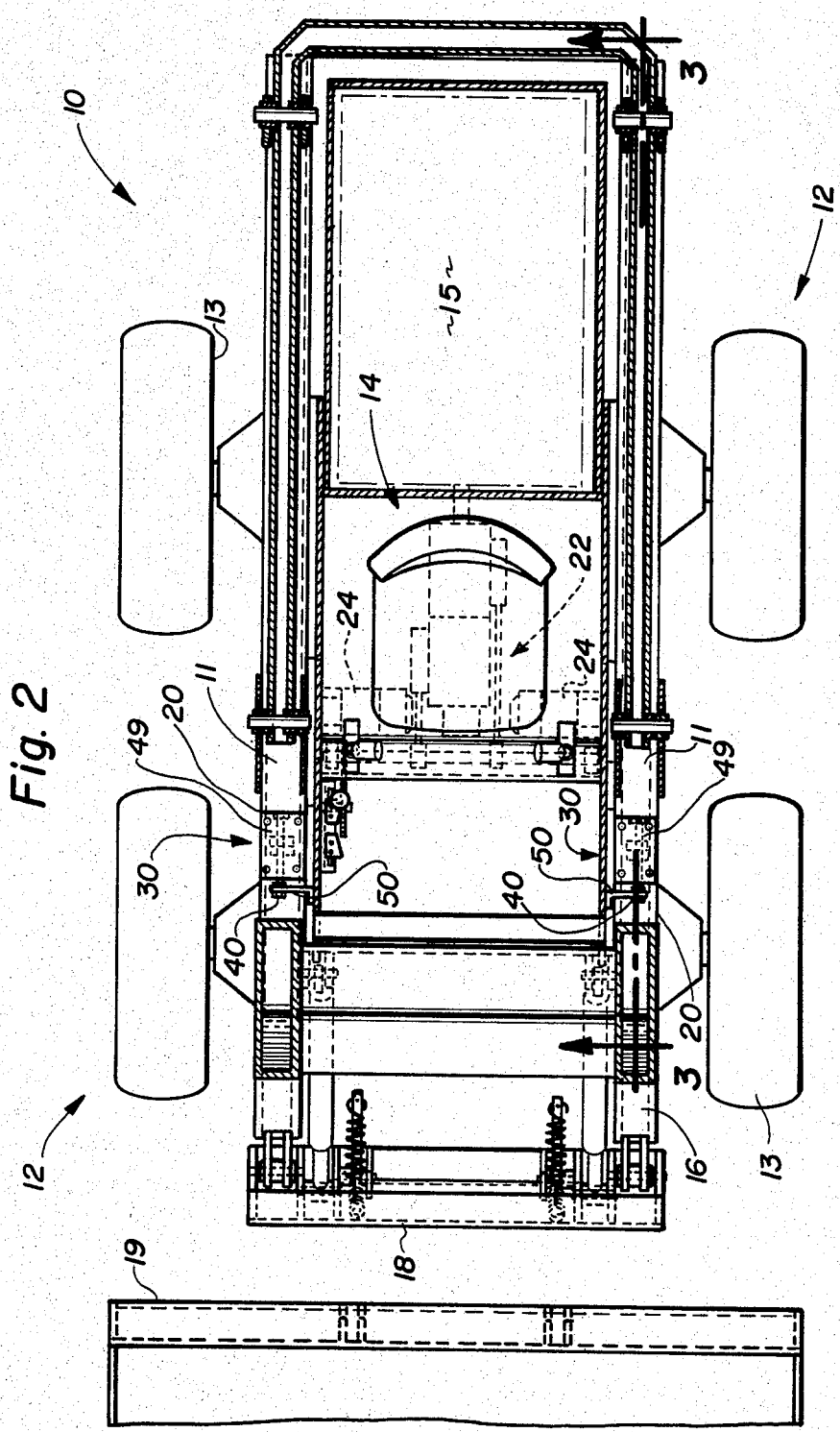

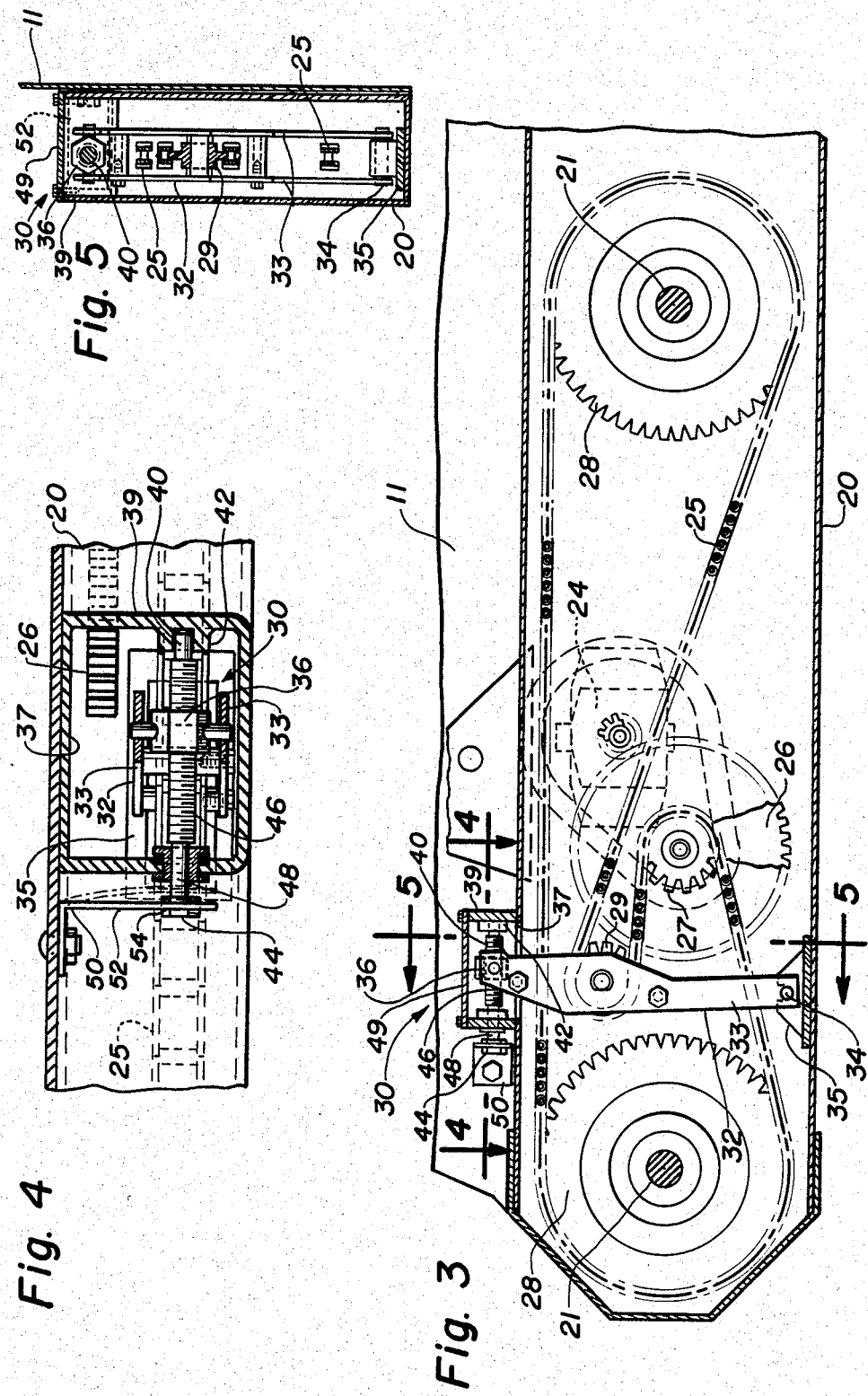

DRIVE CHAIN ADJUSTER

BACKGROUND OF THE INVENTION

The present invention relates generally to skid steer loaders and, more particularly, to improvements in an adjusting mechanism for adjusting the tension in the drive chain.

Skid steer loaders of the type shown in U.S. Pat. No. 3,810,517 utilize a drive chain entrained around sprockets associated with the front and back wheels and around drive and idler sprockets. The idler sprocket is movably mounted to take up the slack in the drive chain. The adjusting mechanism utilizes a draw bolt to move a sliding plate connected to a bracket mounting the idler sprocket to vary the drive chain tension. This adjusting mechanism requires that the seal between the sliding plate and the chain case of the loader be subjected to sliding movement when the chain adjuster is operated, resulting in wear and, therefore, leaking seals. Furthermore, it would be desirable to provide an improved chain tightener that would reduce the amount of time and effort that needs to be expended for manually using the adjusting mechanism to vary the tension in the loader chain drive.

SUMMARY OF THE INVENTION

It is an object of this invention to overcome the aforementioned disadvantages of the prior art by providing an improved chain adjusting mechanism internally operable within the chain case and sealable with an O-ring.

It is another object of this invention to pivotally connect the mounting bracket for the idler sprocket directly to a collar threadably engaged with a threaded member rotatably mounted within a box welded to the chain case of a skid steer loader.

It is a feature of this invention that only a drive portion of the threaded member extends externally of the chain casing.

It is an advantage of this invention that the seal for the adjusting mechanism is not subjected to sliding forces.

It is another feature of this invention that the adjusting mechanism is housed within a box in open communication with the chain case.

It is still another feature of this invention that the box housing the adjusting mechanism can be accessed through an opening sealingly closed by a lid bolted to the box.

It is still another object of this invention to eliminate sealing problems associated with currently available chain adjusting mechanisms.

It is another advantage of this invention that the time and effort required to manually adjust the tension in the drive chain of a skid steer loader is reduced.

It is a further object of this invention to provide a mechanism to prevent movement of the adjusting mechanism during operation of the loader.

It is yet another feature of this invention that a spring clip is engageable with the drive portion of the threaded member of the chain adjusting mechanism to prevent rotation thereof.

It is yet a further object of this invention to provide a chain adjusting mechanism for a skid steer loader which is durable in construction, inexpensive of manufacture, carefree of maintenance, facile in assemblage, and simple and effective in use.

These and other objects, features and advantages are accomplished according to the instant invention by providing a skid steer loader having transversely spaced wheel assemblies driven through a drive chain entrained around a tensioning idler wherein the tensioning idler is mounted in a pair of arms movably positionable by an adjusting mechanism to control the tension in the drive chain. The adjusting mechanism is housed within a box welded to the chain case and includes a necked down portion extending through the box for external manipulation of a drive portion. An O-ring seal prevents the loss of fluid from the box during operation of the loader. A spring clip engagable with the drive portion of the adjusting mechanism prevents the movement thereof during operation of the loader.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is a horizontal cross-sectional view of the skid steer loader taken along lines 2—2 of FIG. 1 to show a plan view of the loader with most of the operator compartment being removed;

FIG. 3 is an enlarged partial cross-sectional view of the chain case of the loader taken along lines 3—3 of FIG. 2;

FIG. 4 is an enlarged cross-sectional detail view of the adjusting mechanism taken along lines 4—4 of FIG. 3; and FIG. 5 is a vertical cross-section taken through the chain case along lines 5—5 of FIG. 3 to show the adjusting mechanism.

DETAILED DESCRIPTION OF THE PREFERRED EMBODIMENT

Figure 1:
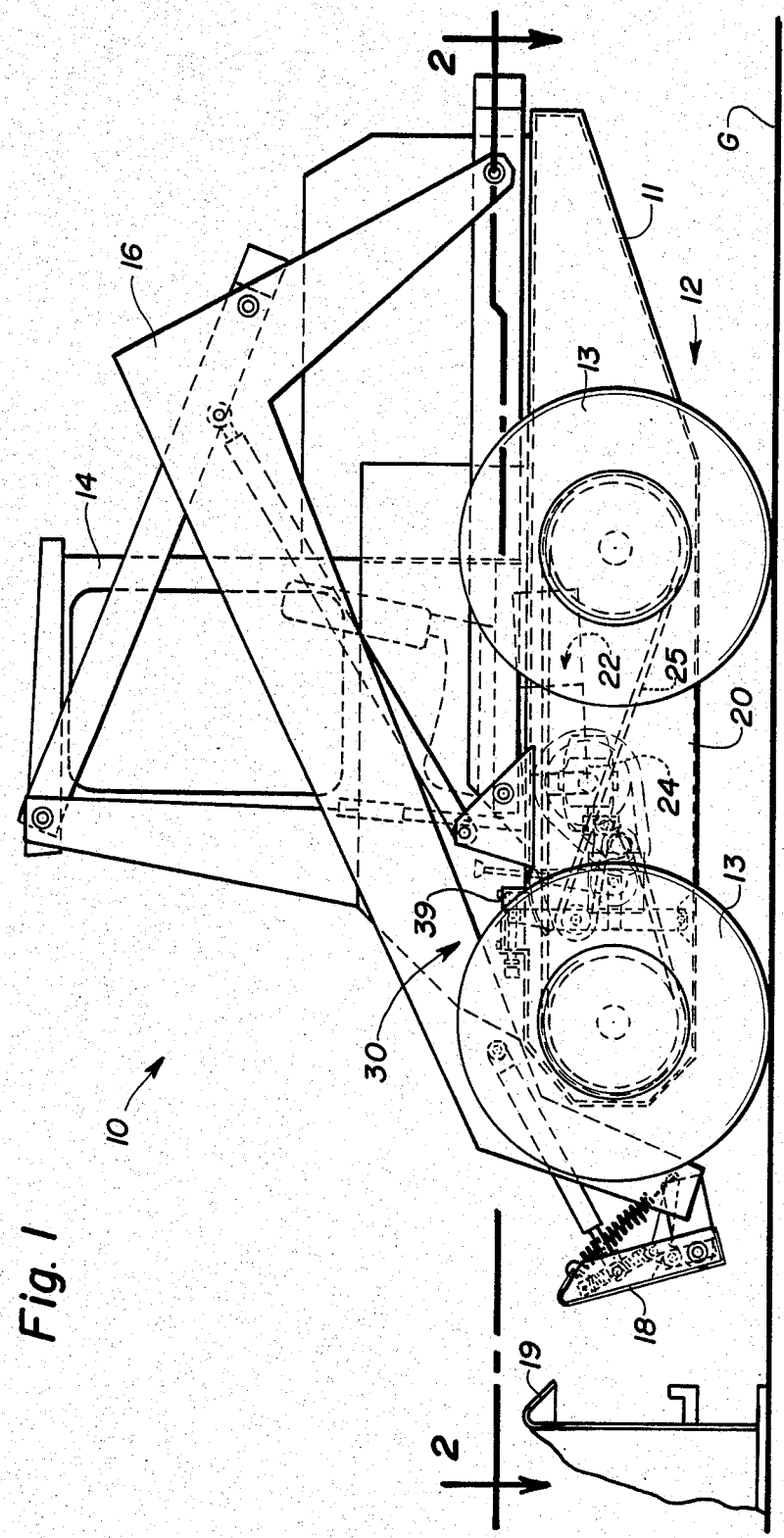
FIG. 1 is a side elevational view of a skid steer loader incorporating the principles of the instant invention, a portion of a bucket attachable to the loader being shown on the ground forwardly thereof.

Referring now to the drawings and, particularly to FIG. 1, a side elevational view of a skid steer loader incorporating the principles of the instant invention can be seen. Any left and right references are used as a matter of convenience and are determined by standing at the rear of the machine, facing the forward end, where the work implement is attached to the loader boom structure. A more detailed description of the skid steer loader and the basic components of a drive chain tensioning mechanism can be found in U.S. Pat. No. 3,810,517, granted on May 14, 1974 to Joseph C. Hurlburt, et al, the description of which is hereby incorporated by reference.

Referring to FIGS. 1 and 2, it can be seen that the loader 10 is supported over the ground G by a pair of transversely spaced wheel assemblies 12, each having longitudinally spaced wheels 13. The operator's compartment 14 is mounted between the wheel assemblies 12 and forwardly of an engine 15, serving as the primary source of power, to command a view of the operation of the boom structure 16 pivotally supported on the frame 11 and having a work implement mounting mechanism 18 located forwardly of the operator's compartment 14 to detachably connect a work implement 19.

Each wheel assembly 12 is rotatably supported from a chain case 20 extending longitudinally along the opposing sides of the loader 10. A hydraulic system 22 operatively connected to the engine 15 provides a source of hydraulic fluid under pressure to a pair of laterally spaced hydraulic motors 24, which supply the source of rotational power for each respective wheel assembly 12. Within each chain case 20, as best seen in FIG. 3, the corresponding hydraulic motor 24 is operatively engaged with a drive gear 26 to effect rotation thereof. An endless drive chain 25 is entrained around a drive sprocket 27 integrally formed with the drive gear 26 and a driven sprocket 28 fixed to the axle 21 of each wheel 13 and an idler sprocket 29 to rotatably drive the wheel assembly 12.

The idler sprocket 29 forms a part of the adjusting mechanism 30 used to take up slack within the drive chain 25 and maintain appropriate tension therein. As is best seen in FIGS. 3 and 5, the idler sprocket 29 is rotatably mounted in a mounting bracket 32 comprising a pair of spaced apart arms 33 between which is mounted a pivot 34 at one end thereof. The pivot 34 is pivotally supported within a slotted bracket 35 affixed to the bottom of the chain case 20. The opposing end of the mounting bracket 32 is pivotally connected to a threaded collar 36. The mounting bracket 32 extends upwardly through an opening 37 in the top of the main body of the chain case 20 into a box-like section 39 welded to the top of the chain case 20 to permit movement of the mounting bracket 32 in a fore-and-aft direction about the pivot 34.

Referring now to FIGS. 3-5, it is seen that an elongated threaded member 40 is journaled at one end within a cup 42 affixed inside the box-like section 39. The member 40 extends outwardly through the opposing side of the box-like section 39 to position a drive head 44 externally of the box-like section 39. A threaded portion 46 of the elongated member 40 is threadably received within the collar 36 to effect a linear movement of the threaded collar 36 when the member 40 is rotated. A necked-down portion 48 extending between the drive head 44 and the threaded portion 46 projects through the box-like section 39 and is engaged with an O-ring seal to prevent the loss of fluid from within the chain case 20. The box-like section 39 is equipped with a removable lid 49 sealingly affixed to the box-like section 39 to permit convenient access to the adjusting mechanism 30.

An L-shaped spring clip 50 is affixed to the frame 11 of the loader 10 and projects outwardly therefrom into engagement with the drive head 44 by an outwardly extending leg 52. The leg 52 is formed with a hole 54 therethrough. The hole 54 has a shape corresponding to the shape of the drive head 44, shown as a hexagonal cross sectional configuration, so that the leg 52 can slip over the drive head 44 and prevent rotation thereof. For example, the hexagonally-shaped drive head could be engaged by either a hexagonally-shaped hole to engage each flat of the drive head or a slot-shaped hole that would engage only two of the drive head flats. As best seen in FIG. 4, the outwardly extending leg 52 is capable of deflecting to a position shown in phantom to disengage the drive head 44 and permit manipulation thereof to effect rotation of the threaded portion 46.

In operation, the fore-and-aft pivotal movement of the mounting bracket 32 about its pivot 34 causes a corresponding movement of the idler sprocket 29 to vary the tension in the drive chain 25. Rotation of the threaded member 40 by manipulation of the externally accessible drive head 44 causes a corresponding rotation of the threaded portion 46 to effect a linear movement of the threaded collar 36. The pivotal connection between the mounting bracket 32 and the threaded collar of 36 permits the fore-and-aft movement defined by the limits of the box-like section 39. The spring clip 50 serves as a lock when engaged with the drive head 44 to prevent rotation of the threaded member 40, such as can be caused by vibrations during the operation of the loader 10. The outwardly extending leg 52 of the spring clip 50 is deflectable away from the drive head 44 to permit a manipulation of the drive head 44. Because of the tension exerted in a rearward direction by the drive chain 35 the threaded member 40 is pulled toward the cup 42, thereby obviating the need to fasten the threaded member 40 to the box-like section 39. Access to the adjusting mechanism 30 can be conveniently gained by removal of the lid 49 from the box-like section 39. Since sliding forces are not exerted through a sealing member, sealing problems are significantly reduced, as are the time and effort necessary to adjust the tension in the loader drive chain 25.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific form shown.

Having thus described the invention, what is claimed is:

1. In a skid steer loader having a main frame; an engine supported by said main frame; a pair of longitudinally spaced wheels disposed on each side of said main frame; drive means for each pair of wheels to transfer rotational power from said engine to said wheels, said drive means including a chain case, a drive sprocket rotatably mounted in said chain case and being operably associated to said engine to power the rotation thereof, a pair of driven sprockets rotatably mounted in said chain case and associated with the wheels on one side of said main frame, an idler sprocket rotatably mounted on an elongated member pivotally mounted within said chain case to permit a movement of said idler sprocket relative to said drive and driven sprockets, an endless chain entrained around said drive sprocket, said driven sprockets and said idler sprocket to transfer rotational power from said drive sprocket to said driven sprockets; and adjustment means mounted on said chain case in operative association with said idler sprocket to adjust the tension of said endless chain, an improved adjustment means comprising:

a threaded member extending through an opening in said chain case such that a drive portion of said threaded member projects externally of said chain case;

a threaded collar pivotally connected to said elongated member within said chain case and threadably engaged with said threaded member such that manipulation of said drive portion to rotate said threaded member effects a linear movement of said threaded collar along said threaded member to effect movement of said idler sprocket for chain tension adjustment; and a seal associated with said threaded member to prevent the transfer of fluids through the opening in said chain case.

2. The loader of claim 1 wherein said chain case includes a box portion affixed thereto in open communication with said chain case, said box portion having said opening therein for the projection of said threaded member therefrom.

3. The loader of claim 2 wherein said box portion is provided with a removable lid sealingly connectable to said box portion to facilitate access to said adjustment means.

4. The loader of claim 2 wherein said box portion includes a cup formed therein to journal an end of said threaded member spaced from said drive portion, the tension of said endless chain urging said threaded member into engagement with said cup.

5. The loader of claim 2 wherein said threaded member includes a threaded portion engaged with said threaded collar and a necked-down portion positioned between said drive portion and said threaded portion, said necked-down portion extending through said box portion and being engaged with an O-ring seal to prevent the escape of lubricating fluid from within said chain case through said opening in said box portion.

6. The loader of claim 5 further comprising a spring clip affixed to said main frame and extending for engagement with the drive portion of said threaded member to restrict rotation of said threaded member during operation of said loader.

7. The loader of claim 6 wherein said spring clip has a hole formed therein of a shape corresponding to a non-circular shape of the drive portion of said threaded member, said hole being positioned to receive said drive portion and prevent rotation of said threaded member.

8. The loader of claim 7 wherein said spring clip is yieldable from pressure exerted externally of said chain case to disengage said drive end and slide over said necked permit rotation of said threaded member to effect adjustment of the tension in said endless chain.

* * * * *